United States Patent [19]

Krigmont et al.

[11] Patent Number: 4,571,330
[45] Date of Patent: Feb. 18, 1986

[54] FLUE GAS DESULFURIZATION

[75] Inventors: Henry V. Krigmont, Van Nuys; Harold H. Haaland, North Hollywood; Ronald J. Triscori, Monrovia; Herbert W. Spencer, III, Valencia; Jay L. Stern, Los Angeles, all of Calif.

[73] Assignee: Joy Manufacturing Company, Pittsburgh, Pa.

[21] Appl. No.: 537,125

[22] Filed: Sep. 29, 1983

[51] Int. Cl.⁴ .......................... C01B 17/00; B01J 8/00
[52] U.S. Cl. ..................................... 423/242; 423/244
[58] Field of Search .......... 423/242 A, 242 R, 244 A, 423/244 R; 55/73; 422/62

[56] References Cited

U.S. PATENT DOCUMENTS 4,197,278  4/1980  Gehri et al. .......................... 423/242
4,279,873  7/1981  Felsvang et al. ................... 423/242

Primary Examiner—Gregory A. Heller
Attorney, Agent, or Firm—Edward L. Levine

[57] ABSTRACT

Systems for desulfurization of a flue gas containing fly ash including formation of a dry powder in a spray dryer absorber resulting from reaction of an alkaline aqueous feed and the flue gas. The dry powder is collected and a specifically selected fraction is recycled to a feed preparation subsystem for inclusion in the aqueous feed. Selective recycle is based on physical or chemical properties and, for example, large diameter and dense particles provide enhanced reagent utilization compared to smaller and less dense particles.

15 Claims, 4 Drawing Figures

FLUE GAS DESULFURIZATION

BACKGROUND OF THE INVENTION

1. Field of the Invention

This invention relates to systems for desulfurization of a flue gas containing sulfur oxides and which may also contain fly ash, and more particularly provides desulfurization systems incorporating a spray dryer absorber and selective recycle of fractions of the spray drying product through the system.

2. Description of the Prior Art

So-called dry desulfurization or dry scrubbing processes are well known and in recent years have achieved increased commercial success relative to so-called wet desulfurization processes. Dry processes are particularly useful in treating flue gas discharged from utility and industrial boilers. These processes typically combine a sprayed liquid and the hot flue gas in a spray dryer absorber and produce a dry powder and gas depleted in sulfur compounds. The sulfur is fixed in the dry powder generally in the form of sulfites and sulfates. The liquid reagent which is sprayed typically is a solution of a soluble strong base or a slurry such as calcium hydroxide.

The economic viability of such systems depends in large part on the stoichiometry achievable with a given reagent. A system which achieves relatively good stoichiometry with a lime reagent is described in U.S. Pat. No. 4,279,873. In that system an aqueous feed including calcium hydroxide is fed to an atomizer and atomized into a flue gas containing fly ash. Conventionally, the powder is separated into two portions within the spray dryer absorber for transport from the spray dryer absorber. A portion of the separated dry powder formed by the atomizer is recycled directly to an aqueous feed preparation system and another portion is transferred to a gas-particulate filter such as a baghouse or an electrostatic precipitator. The powder in each of the portions is similar, there being no discrimination in the transferring process. Some of the powder collected in the gas-particulate filter is subsequently also recycled to the feed preparation system. A part of both the directly recycled powder and the powder removed in the filter is discharged, including an amount of unreacted reagent.

The referenced teaching attributes, at least in part, the achievement of acceptable lime stoichiometric ratios to the recirculation of fine fly ash particles which are especially efficient in acting as carriers for fresh lime because of their smaller size as compared to particles formed by absorption and spray drying. It is noted in the disclosure that the small size has proved to be optimum for performance of the carrier function. A great amount of particles is also stated in the disclosure to have a markedly stabilizing effect in maintaining the fine calcium hydroxide particles in suspension. It also appears that alkalinity in the recycled fly ash is used in the process.

While the referenced disclosure teaches a system which does achieve desulfurization of flue gas at advantageous stoichiometric ratios, further improvements in stoichiometric ratios and reagent consumption are desirable.

SUMMARY OF THE INVENTION

This invention provides systems wherein improved stoichiometric ratios and reagent consumption are achieved. In a preferred embodiment a hot flue gas containing undesirable sulfur compounds and which can, but need not necessarily contain fly ash, is directed to a spray dryer absorber into which is sprayed an aqueous feed. The dry product produced in the spray dryer absorber and the gas reduced in sulfur content are directed to a gas-particulate separation device having a plurality of chambers for collecting the separated particulates. In one preferred form the device is an electrostatic precipitator having a plurality of fields through which the gas-powder mixture is passed in series. Associated with each field is a corresponding hopper which collects the dry powder from the precipitator plates of the respective field.

It has been found that the powder collected in the serially arranged hoppers differs among hoppers in both physical and chemical makeup. For example, it has been found that the upstream or former of the serially arranged hoppers tend to collect particles of larger mass mean diameter and mean density compared to the downstream or latter hoppers and, unexpectedly, of a reactivity which, when recycled to the aqueous feed, enhances the stoichiometric ratio and reagent utilization of the desulfurization process as compared to the indiscriminate recycle of the dry powder. The powder from the downstream hoppers contains, on an equivalent basis, more inert materials than the powder from the upstream hoppers. In preferred form, powder from the former or upstream precipitator fields and hoppers is selectively recycled to the aqueous feed preparation subsystem. Powder from the latter or downstream fields and hoppers is discharged from the hoppers for ultimate discharge or reprocessing. The number of fields used for recycle can be fixed, or can selectively vary during plant operation. The cleaned gas is discharged, for example, through a stack. The quantity of fresh reagent required for the spray drying process is reduced.

In another embodiment dry powder from the spray dryer absorber is directed to a gas-particulate separation device such as a precipitator or a baghouse which separates the powder and the flue gas and which collects the powder in a plurality of substantially segregated chambers. A sampling device or process is utilized to determine a common parameter among powder samples in the respective chambers and powder in those chambers which will provide the highest reactivity is recycled to the feed preparation subsystem.

In yet another embodiment, powder from the spray dryer absorber is separated from the flue gas in a baghouse or precipitator, collected in one or more chambers, and transferred to a mechanical separation device which separates the powder into at least two fractions based upon physical properties such as mean density, mass mean diameter, or mean aerodynamic diameter. All or a portion of the fraction having the larger diameter, density, mass diameter or aerodynamic diameter is then selectively recycled to the feed preparation subsystem.

Except for the term "mass mean diameter," as used herein the "mean" of a set of numbers or parameters is defined as the sum of all the numbers divided by the number of them. Thus, the "mean density" of a quantity or sample of powder is the sum of the density of the particles divided by the number of particles. As known, a parameter such as mean density for a given quantity of powder can be determined by analyzing a gross sample, as opposed to the actual counting of individual particles. "Alkalinity" is defined as the capacity of an alkaline material to neutralize $SO_2$. "Reactive alkalinity"0 is a parameter determined, for example, by acid titration and expressed as moles per pound of material. Reactive alkalinity is distinguished from "total alkalinity" which is the theoretical moles of alkaline per pound of material as determined by chemical analysis. "Mass mean diameter" is the diameter of a particle which has the average mass for the entire particle distribution. "Aerodynamic diameter" is the diameter of a sphere of unit density that obtains the same terminal settling velocity at low Reynolds numbers in still air as the actual particle under consideration. As will be noted from this disclosure, it is important in some cases to determine the relative value of these parameters among powders in various chambers and, in this regard, the terms are used in a common sense to provide a comparative valuation.

BRIEF DESCRIPTION OF THE DRAWINGS

The advantages, nature and additional features of the invention will become more apparent from the following description taken in connection with the accompanying drawings, in which.

DESCRIPTION OF THE PREFERRED EMBODIMENTS

Figure 1:
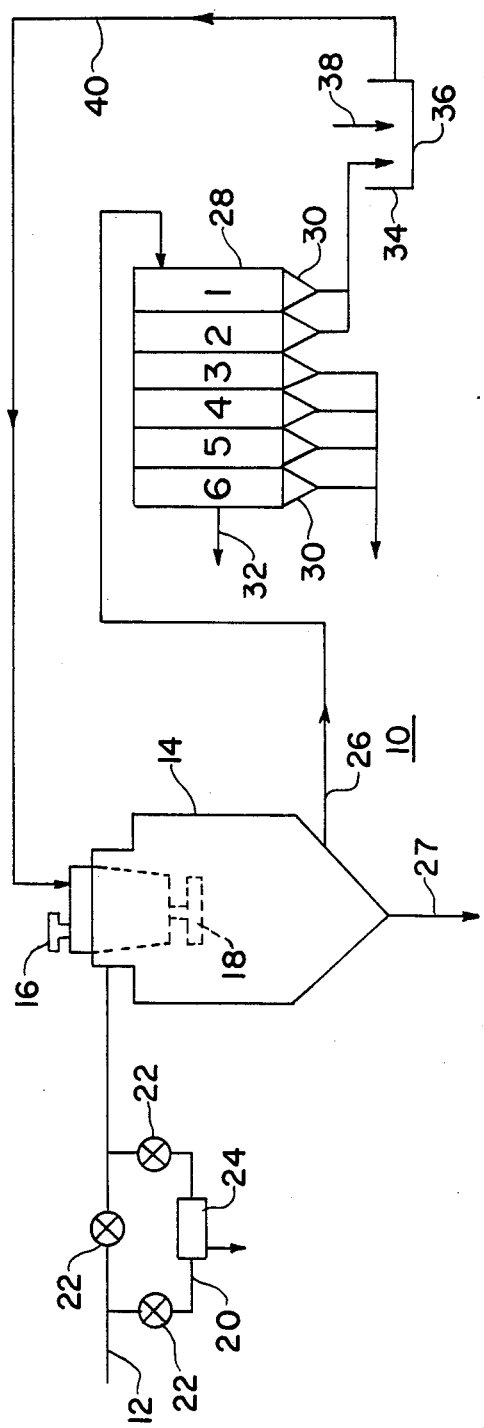
FIG. 1 is a schematic flow diagram of a flue gas desulfurization system in accordance with the invention, particularly utilizing a multi-field electrostatic precipitator.

Referring now to FIG. 1 there is shown a flue gas desulfurization system, generally indicated by reference numeral 10. A hot flue gas containing sulfur compounds and which can contain fly ash is transported through a conduit 12 to a spray dryer absorber 14. The spray dryer absorber 14 is of conventional design, and preferably is of the rotary atomizer type including a motor 16 and an atomizer wheel 18. A bypass loop 20 including valves 22 and a treatment device 24 can be incorporated upstream of the spray dryer absorber 14 to pretreat the flue gas and/or remove at least a portion of the fly ash for other or later use.

An aqueous feed incorporating a soluble or insoluble strong base, preferably including a suspension of calcium hydroxide formed as described further hereinafter, is atomized into the spray dryer and reacts with the sulfur compounds such as $SO_2$ to simultaneously dry the sprayed feed and reduce the sulfur content of the flue gas. A dry powder is formed which comprises materials formed during the drying and sulfur absorption reaction including depleted and active reagent, and which can include conglomerates of fly ash and such formed materials.

The dry powder and gas are conveyed through conduit 26 to a gas-particulate separation device such as an electrostatic precipitator 28. The precipitator 28 has a plurality of fields designated by numerals 1 through 6, through which the gas and powder is serially passed. Each field may include a plurality of parallel channels and/or hoppers 30. As the gas and powder flow through the precipitator 28, the powder is collected on plates (not shown) and is subsequently removed from the plates, for example by impact loading, and is collected in the hoppers 30 below. The cleaned gas exits the precipitator 28 through conduit 32 for further treatment or ultimate discharge through a stack.

Powder collected in the former or upstream hoppers 30, for example, powder from hoppers corresponding to fields numbered 1 and 2, is recycled, preferably in a batch process, to a reagent preparation subsystem 34. In accordance with conventional design, the powder in the spray dryer absorber is separated into two streams, the larger volume of which flows through conduit 26. Powder from the second stream is discharged through a conduit 27 and can be directed either to the feed preparation system 34 or to discharge. Preparation subsystem 34 includes conventional feed preparation and mixing equipment, and is exemplified in the Figures by a single tank 36 into which active reagent such as calcium hydroxide and an aqueous medium such as water are fed through one or more conduits 38. The selectively recycled powder from the hoppers and, where desired, powder from conduit 27, is mixed with so much of the aqueous medium and fresh reagent as may be required. The thus prepared feed is transferred from the preparation subsystem 34 to the spray dryer absorber 14 through conduit 40 for reaction with the incoming flue gas. The actual quantities utilized in the feed preparation are preferably adjusted through sampling and analysis. Through continual recycling of dry powder collected from the upstream first and second fields, the mass mean diameter of the powder, for example, will increase with time. This additionally provides an increase in the collection efficiency in the upstream fields to a point where the system reaches equilibrium. The mass mean diameter of the recycled powder at equilibrium is greater than the mass mean diameter of the straight fly ash in the original flue gas.

Figure 2:
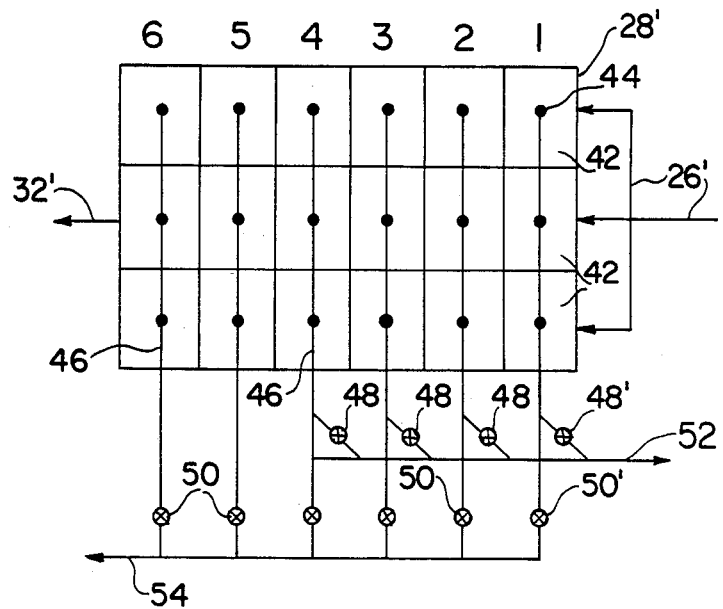
FIG. 2 is a schematic, generally a top view of an electrostatic precipitator having a plurality of fields, each field having plural hoppers, and including a dry powder discharge arrangement in accordance with the invention.

The system of FIG. 1 utilizes recycle of dry powder from specific upstream fields selected in advance of operation. FIG. 2 shows an arrangement whereby dry powder can be selectively recycled from any number of the fields, preferably the upstream fields. A precipitator 28' is shown which includes six fields designated by numerals 1 through 6 and three channel areas 42 corresponding to each field. Each channel area 42 has a corresponding hopper 30, the discharge of which is represented by the solid circles 44. A discharge conduit 46 connects the discharge from the hoppers of each field. As shown, the discharge conduits 46 at the upstream side of the precipitator are each associated with recycle valves 48. All of the discharge conduits 46 also have associated discharge valves 50. Through coordination of opening and closing of the valves 48, 50, powder from any of the upstream fields (1 through 4 in this example) can be selectively directed to the feed preparation subsystem 34 through a conduit 52. Powder from any of the fields (1 through 6) can also be directed through a conduit 54 to ultimate discharge or further processing. It may be desirable in some applications to incorporate the arrangement with valves 48 in all of the fields. Opening of the recycle valve 48', for example, coupled with closing of the other recycle valves 48 and discharge valve 50', will recycle powder only from the foremost field number 1. Additional valves or other means for controlling powder flow can be used, for example in conduit 52, to ensure that powder flows only in the desired direction. The flue gas and dry powder mixture enter the precipitator 28' through inlet conduits 26', pass in series through the consecutive fields, and clean gas is discharged through one or more outlet conduits 32'. During one mode of operation, for example, powder to be recycled can be taken from the first field and, if there is an insufficient amount, then powder from the second field can be added, and so forth.

Figure 3:
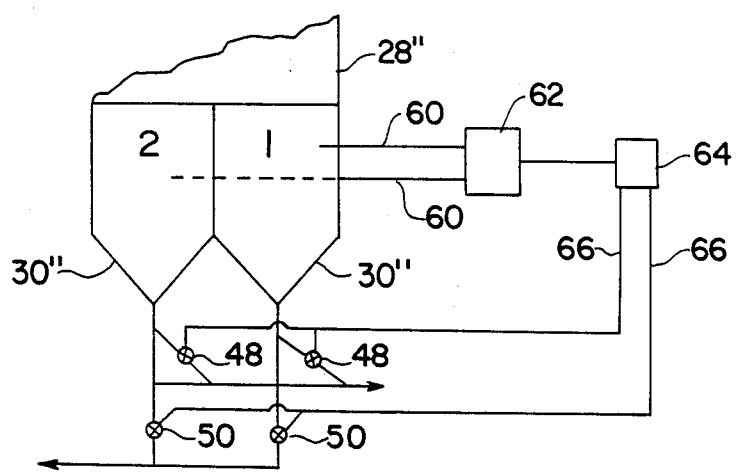
FIG. 3 is a schematic of a portion of an electrostatic precipitator and associated hoppers, additionally showing system control apparatus in accordance with the invention.

FIG. 3 schematically shows another embodiment including an electrostatic precipitator 28" having plural fields in series with respect to gas flow and corresponding hoppers 30" in series. Included are means for taking a sample amount of the powder from each hopper 30", which can include conduits 60. The samples are analyzed in a detector 62, and the detected results are processed in a processor or comparator 64 which generates a predetermined signal through lines 66 to open or close the corresponding valves 48, 50. The means for detecting a physical or chemical parameter indicative of reactivity with sulfur oxides, such as $SO_2$, the detector 62, can detect, for example, one or more of the mean density, mass mean diameter, mean aerodynamic diameter, equivalent alkalinity and reactive alkalinity of the powder. The means for processing or comparing the determined parameter, the comparator 64, determines which hoppers contain powder having parameters of largest value and hence good overall reagent utilization for recycle. It will be apparent that taking a sample, analyzing a sample, processing and/or comparing the detected results against one another and/or predetermined values, and opening or closing the respective valves can each be performed manually.

Figure 4:
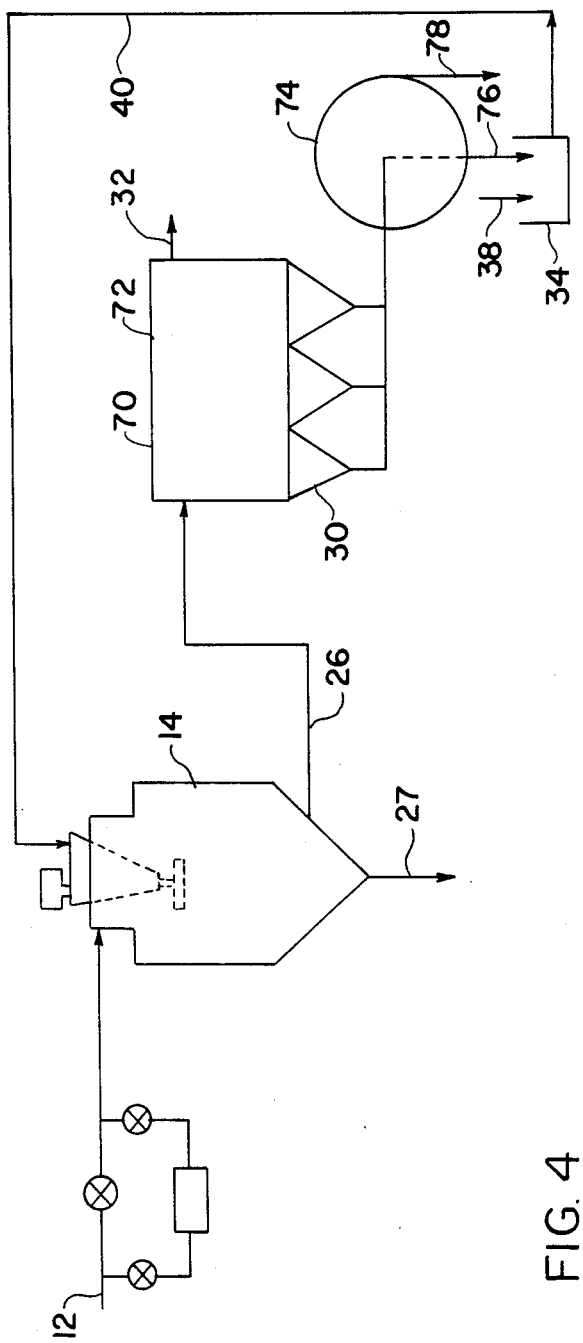
FIG. 4 is a schematic flow diagram of another flue gas desulfurization system in accordance with the invention.

Yet another embodiment which provides selective recycle of an amount of powder having a higher reactivity or usefulness in the absorption process when recycled to the aqueous feed compared to other fractions of the powder, thus providing a higher system stoichiometric ratio and reagent utilization, is shown in FIG. 4. The system takes particular advantage of physical properties of the powder such as its fluidity and specific gravity or particle size. The front end of the system is generally similar to that shown in FIG. 1. However, the system differs in that a number of types of conventional gas-particulate separating devices 70 can be utilized. The gas and particulate mixture transferred through conduit 26 enters a gas-particulate separator such as a baghouse 72 and a clean gas exits through conduit 32. Powder is collected in one or more chambers such as the hoppers 30, and is transferred, preferably in a batch process, to a mechanical separation device or means for segregating the powder into at least two streams having differing physical characteristics, such as a cyclone 74. More dense powder particles are discharged through conduit 76 to the feed preparation subsystem 34, and less dense powder particles are discharged through conduit 78 for reprocessing or ultimate disposal. A fluidizing agent may be added to the powder upstream of, or in, the cyclone.

Analytical evaluation was performed on powders from a pilot plant facility using a lime reagent and having an electrostatic precipitator with three fields, each field having two hoppers. As shown from the tabulation below, the powder continually decreased in both mass mean diameter and alkalinity from the former, upstream field and hoppers (1A and 1B) toward the latter, downstream field and hoppers (3A and 3B).

| Field/Hopper | Mass Mean Diameter (Microns) | Alkalinity Milliequivalents Per Gram |
| --- | --- | --- |
| 1A | 6.0 | 0.23 |
| 1B | 5.9 | 0.265 |
| 2A | 5.9 | 0.238 |
| 2B | 5.8 | 0.229 |
| 3A | 5.75 | 0.214 |
| 3B | 5.7 | 0.183 |

It will be recognized that the disclosed exemplary systems provide, through selective recycle, good stoichiometry and reagent utilization, whether or not fly ash is utilized. It is noted that while the systems have been described with particular reference to selective recycle of those fractions of collected powder which are highest in the ability to react favorably with $SO_2$, it is contemplated that in some instances it may be desirable to selectively recycle fractions other than those which are highest in this ability. Such operation can be performed with the disclosed systems.

It will be apparent that many modifications and additions to the specific selective recycle system embodiments shown are possible. It therefore is intended that the foregoing description and Figures be taken as illustrative, and not in a limiting sense.

We claim:

1. A process for desulfurization of a flue gas containing sulfur oxides, comprising:
   spraying an aqueous feed comprising a reagent reactive with said sulfur oxides into said flue gas in a spray dryer absorber, thereby simultaneously drying said sprayed feed and reducing the sulfur oxide content of said flue gas, and forming a dry powder;
   conducting said dry powder and said gas reduced in sulfur oxide content to a gas-particulate separator;
   collecting said powder from said separator in a plurality of chambers;
   determining, in each of said chambers, the value of at least one of a physical and a chemical parameter of said powder indicative of reactivity with sulfur oxides;
   selecting, based on said determined values, those chambers containing powder having a greater indication of reactivity with sulfur oxides; and preparing said aqueous feed from an aqueous medium and dry powder from said selected chambers.

2. The process of claim 1 wherein said reagent comprises $Ca(OH)_2$.

3. The process of claim 1 wherein said parameter is mass mean diameter.

4. The process of claim 1 wherein said parameter is alkalinity.

5. The process of claim 1 wherein said parameter is reactive alkalinity.

6. The process of claim 1 wherein said parameter is one of mean density and density.

7. The process of claim 1 wherein said parameter is one of mean aerodynamic diameter and aerodynamic diameter.

8. The process of claim 1 wherein said parameter is a physical property of said powder selected from the group including fluidity, specific gravity and particle size.

9. A process for desulfurization of a flue gas containing fly ash and sulfur oxides, comprising:

spraying an aqueous feed comprising at least a portion of said fly ash and a reagent reactive with said sulfur oxides into said flue gas in a spray dryer absorber, thereby simultaneously drying said sprayed feed and reducing the sulfur oxide content of said flue gas, and forming a dry powder comprising conglomerates of fly ash and materials formed by said drying and sulfur oxide absorption;

conducting said dry powder and said gas reduced in sulfur oxide content to an electrostatic precipitator having a plurality of serially arranged fields and corresponding serially arranged hoppers;

collecting said dry powder in said hoppers; and preparing said feed from an aqueous medium and said dry powder from less than all and including the former of said serially arranged hoppers.

10. The process of claim 9 further comprising continuing of said spraying, conducting, collecting and preparing steps until such point as the mass mean diameter of said powder collected in said former hoppers is larger than the mass mean diameter of said fly ash.

11. The process of claim 10 further comprising continuing said spraying, conducting, collecting and preparing steps such that the mean diameter of said powder collected in said former hoppers is larger than the mass mean diameter of said fly ash.

12. A process for desulfurization of a flue gas containing sulfur dioxide, comprising:

spraying an aqueous feed comprising a reagent reactive with said sulfur dioxide into said flue gas in a spray dryer absorber, thereby simultaneously drying said sprayed feed and reducing the sulfur dioxide content of said flue gas;

collecting in a plurality of chambers a dry powder comprising materials formed by the drying and sulfur dioxide absorption step;

determining the relative value of at least one of a physical and a chemical parameter of said dry powder indicative of reactivity with sulfur oxides in each of said chambers relative to the value of said powder parameter in each of the other of said chambers;

selecting, based on said determination, those chambers containing powder having a greater indication of reactivity with sulfur oxides; and preparing said aqueous feed from an aqueous medium and dry powder from said selected chambers.

13. The process of claim 12 wherein said collecting step comprises flowing said dry powder through an electrostatic precipitator having a plurality of hoppers.

14. The process of claim 12 wherein said collecting step comprises flowing said dry powder serially through a baghouse and then through a mechanical separator having at least two outlets discharging said dry powder to two containers.

15. In a process for desulfurization of a flue gas containing sulfur oxides of the type including (a) spraying an aqueous feed comprising a reagent reactive with said sulfur oxides into said flue gas in a spray dryer absorber, thereby simultaneously drying said sprayed feed and reducing the sulfur oxide content of said flue gas and forming a dry powder, (b) conducting said dry powder and said gas reduced in sulfur oxide content to a gas-particulate separator, and (c) collecting said powder from said separator in a plurality of chambers, the improvement comprising:

determining, in each of said chambers, the value of a parameter of said powder selected from the group consisting of alkalinity, reactive alkalinity, density, mean density, aerodynamic diameter, mean aerodynamic diameter and chemical composition;

selecting certain of said chambers based on said determined values; and preparing said aqueous feed from an aqueous medium and dry powder from said selected certain chambers.

* * * * *

UNITED STATES PATENT AND TRADEMARK OFFICE
CERTIFICATE OF CORRECTION

PATENT NO. : 4,571,330

DATED : February 18, 1986

INVENTOR(S) : H. V. Krigmont et al

It is certified that error appears in the above-identified patent and that said Letters Patent are hereby corrected as shown below:

Column 3, line 1 after the word alkalinity" delete "0".

Column 7, line 24 before the word "mean" insert -- mass --.

Signed and Sealed this

Twenty-second Day of July 1986

[SEAL]

Attest:

DONALD J. QUIGG

Attesting Officer

Commissioner of Patents and Trademarks